US009310800B1

(12) United States Patent
Datcher et al.

(10) Patent No.: US 9,310,800 B1
(45) Date of Patent: Apr. 12, 2016

(54) ROBOTIC PLATFORM EVALUATION SYSTEM

(71) Applicant: The Boeing Company, Chicago, IL (US)

(72) Inventors: Jarrett R. Datcher, Renton, WA (US); Emad William Saad, Renton, WA (US); John Lyle Vian, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 126 days.

(21) Appl. No.: 13/954,555

(22) Filed: Jul. 30, 2013

(51) Int. Cl.
G05B 19/418 (2006.01)

(52) U.S. Cl.
CPC .................... G05B 19/418 (2013.01)

(58) Field of Classification Search
CPC ...... B25J 13/003; B25J 19/021; B25J 19/027; B25J 11/0005; G10L 25/78; G10L 15/20; G10L 13/00; G10L 13/04; G10L 15/22; G10L 25/81; G10L 25/84; G01S 1/70; G01S 13/765; G05B 19/418
USPC ........................ 700/248, 257, 258; 901/1, 3, 8
See application file for complete search history.

(56) References Cited

U.S. PATENT DOCUMENTS

| 5,436,444 | A * | 7/1995 | Rawson | A61B 5/1126 250/227.14 |
|---|---|---|---|---|
| 6,577,924 | B1 * | 6/2003 | Kasuga | G06N 3/008 340/7.2 |
| 7,813,888 | B2 | 10/2010 | Vian et al. | |
| 8,068,983 | B2 | 11/2011 | Vian et al. | |
| 8,170,241 | B2 * | 5/2012 | Roe | B25J 19/023 381/122 |
| 2002/0120361 | A1 * | 8/2002 | Kuroki | G05B 19/00 700/245 |
| 2003/0055653 | A1 * | 3/2003 | Ishii | A63H 11/00 704/275 |
| 2003/0093182 | A1 * | 5/2003 | Yokoyama | G06N 3/008 700/245 |
| 2003/0152261 | A1 * | 8/2003 | Hiroe | G10L 13/047 382/153 |
| 2003/0158628 | A1 * | 8/2003 | Matsuoka | G06K 17/00 700/245 |
| 2003/0158629 | A1 * | 8/2003 | Matsuoka | G06Q 30/0631 700/245 |
| 2003/0163320 | A1 * | 8/2003 | Yamazaki | G10L 13/10 704/270 |
| 2004/0015265 | A1 * | 1/2004 | Asano | B25J 13/003 700/245 |
| 2004/0054531 | A1 * | 3/2004 | Asano | G10L 15/20 704/231 |
| 2004/0087152 | A1 * | 5/2004 | Lian | G01B 11/0675 438/689 |
| 2004/0230428 | A1 * | 11/2004 | Choi | G10L 21/0208 704/226 |
| 2005/0137747 | A1 * | 6/2005 | Miro | G06N 3/008 700/245 |
| 2005/0218292 | A1 * | 10/2005 | Kawabe | G01S 1/70 250/206 |
| 2005/0219114 | A1 * | 10/2005 | Kawabe | G01S 13/765 342/47 |
| 2005/0222713 | A1 * | 10/2005 | Kawabe | B25J 19/027 700/259 |

(Continued)

*Primary Examiner* — Khoi Tran
*Assistant Examiner* — Jorge Peche
(74) *Attorney, Agent, or Firm* — Yee & Associates, P.C.

(57) ABSTRACT

A method and apparatus for evaluating a group of robotic platforms is present. The method controls the group of robotic platforms to perform operations in an operating area. Environmental signals are generated in the operating area. A response of the group of robotic platforms to an input is identified. A determination is made as to whether the response is a desired response.

25 Claims, 9 Drawing Sheets

(56) References Cited

U.S. PATENT DOCUMENTS

| | | | | |
|---|---|---|---|---|
| 2005/0271279 A1* | 12/2005 | Fujimura | ........... | G06K 9/00355 382/203 |
| 2006/0020467 A1* | 1/2006 | Iwaki | ................ | G01C 21/3629 704/258 |
| 2006/0058920 A1* | 3/2006 | Matsunaga | ........... | B25J 9/1694 700/245 |
| 2006/0126918 A1* | 6/2006 | Oohashi | ............... | G05D 1/0251 382/153 |
| 2006/0129275 A1* | 6/2006 | Ogawa | ................. | B25J 13/003 700/245 |
| 2006/0143017 A1* | 6/2006 | Sonoura | ................. | G10L 15/26 704/275 |
| 2007/0192910 A1* | 8/2007 | Vu | ......................... | B25J 5/007 700/245 |
| 2007/0250212 A1* | 10/2007 | Halloran | ................... | A47L 5/30 700/245 |
| 2008/0071540 A1* | 3/2008 | Nakano | ................... | G10L 15/24 704/251 |
| 2008/0298599 A1* | 12/2008 | Kim | ....................... | G10L 25/69 381/58 |
| 2009/0204395 A1* | 8/2009 | Kato | ..................... | G10L 13/033 704/206 |
| 2009/0210227 A1* | 8/2009 | Sugiyama | ............... | G10L 15/22 704/246 |
| 2010/0087954 A1* | 4/2010 | Chung | ................... | A63H 11/00 700/245 |
| 2010/0217437 A1* | 8/2010 | Sarh | ....................... | B64F 5/0009 700/248 |
| 2010/0254539 A1* | 10/2010 | Jeong | ................. | G10L 21/0272 381/56 |
| 2011/0010007 A1* | 1/2011 | Sarh | ........................ | B25J 5/007 700/248 |
| 2011/0240382 A1* | 10/2011 | Gettings | .............. | B62D 55/075 180/9.1 |
| 2012/0116588 A1* | 5/2012 | Lee | ....................... | G05D 1/0225 700/259 |
| 2012/0130716 A1* | 5/2012 | Kim | ....................... | B25J 13/003 704/256.1 |
| 2012/0309261 A1* | 12/2012 | Boman | ................... | A63H 30/04 446/268 |
| 2012/0316676 A1* | 12/2012 | Fouillade | ............. | B25J 11/0005 700/246 |
| 2013/0072251 A1* | 3/2013 | Kim | ..................... | H04M 1/7253 455/550.1 |
| 2013/0094656 A1* | 4/2013 | Fung | .................... | H03G 3/3005 381/57 |

* cited by examiner

ROBOTIC PLATFORM EVALUATION SYSTEM

BACKGROUND INFORMATION

1. Field

The present disclosure relates generally to manufacturing products and, in particular, to manufacturing facilities. Still more particularly, the present disclosure relates to a method and apparatus for evaluating robotic platforms in a manufacturing facility.

2. Background

A manufacturing facility for products such as an aircraft may be very complex. For example, an aircraft may be manufactured in various stages in which different components such as wings, engines, a fuselage, and other parts are assembled. The different components may then be put together to form the aircraft. These different components may be manufactured in different areas. These areas may be at the same or different geographic locations.

Manufacturing aircraft is a very time consuming and extensive process. The assembly time for the aircraft may be, for example, about four or five months for commercial aircraft. Robotic platforms are being used more and more frequently to aid in the assembly of aircraft. Robotic platforms may reduce the time needed to assemble an aircraft as well as reduce safety issues for human operators.

For example, mobile robotic platforms may carry components from one area to another area for assembly. For example, mobile robotic platforms may move a wing along a path during the assembly of the wing. Mobile robotic platforms also may move a wing from one location to another location. Additionally, robotic platforms also may perform operations such as drilling, fastener installation, paint application, sealant application, inspections, and other suitable operations in different areas in a manufacturing facility.

The use of robotic platforms in a manufacturing facility may occur after extensive planning for their use in a manufacturing facility. The planning may include creating configurations for the location, movement, or both for the robotic platforms. Simulations may be performed for these different configurations.

The simulations may be performed to identify whether movement of mobile robotic platforms may encounter obstructions, such as cables, of the robotic platforms, or other objects in the area of the manufacturing facility. Further, the simulations also may identify areas of movement which human operators should avoid for increased safety. Additionally, the simulations also may identify savings in terms of time needed to assemble aircraft.

The different simulations currently performed for robotic platforms, however, may not take into account as many factors as desired. As a result, a configuration of robotic platforms in an area may need to be revised after actual testing of the robotic platforms.

Therefore, it would be desirable to have a method and apparatus that take into account at least some of the issues discussed above, as well as other possible issues.

SUMMARY

In one illustrative example, a method for evaluating a group of robotic platforms is present. The method controls the group of robotic platforms to perform operations in an operating area. Environmental signals are generated in the operating area. A response of the group of robotic platforms to an input is identified. A determination is made as to whether the response is a desired response.

In another illustrative example, a robotic platform evaluation system comprises an evaluator. The evaluator is configured to generate environmental signals in an operating area while a group of robotic platforms perform operations in the operating area. The evaluator is further configured to identify a response of the group of robotic platforms to an input. The evaluator is still further configured to determine whether the response is a desired response.

In yet another illustrative example, an aircraft management system comprises a control system and an evaluator in the control system. The control system is configured to control equipment in the aircraft management system. The evaluator is configured to control a group of robotic platforms in the equipment to perform operations in an operating area in the aircraft management system. The evaluator is also configured to generate environmental signals in the operating area. The evaluator is further configured to identify a response of the group of robotic platforms to an input. The evaluator is still further configured to determine whether the response is a desired response. Action is identified when an undesired response is present in which the action is selected from at least one of changing a configuration of the operating area, selecting a different group of robotic platforms, or adding objects in the operating area to reduce the undesired response.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that one manner in which simulations may be performed is to use physical and virtual objects. For example, the illustrative embodiments recognize and take into account that physical robotic platforms may be tested in virtual situations. For example, virtual objects may be placed in different locations and the robotic platforms may perform operations with respect to those virtual objects.

The illustrative embodiments also recognize and take into account that these types of simulations may not take into account as many factors as desired. The illustrative embodiments recognize and take into account that with the increasing complexity of robotic platforms, other factors may be present in a manufacturing facility or other locations.

For example, the illustrative embodiments recognize and take into account that robotic platforms that receive input such as verbal instructions may be used. The verbal instructions may include commands and information needed to perform operations.

The illustrative embodiments recognize and take into account that environmental signals such as sound may reduce the ability of a robotic platform to process verbal instructions as desired. Further, with the sensor systems used in the robotic platform, a directionality or location of the human operator may be desirable. This information may be obtained from a microphone system. The illustrative embodiments recognize and take into account that sound from other objects in the area may reduce the accuracy of a position location system.

Further, the illustrative embodiments recognize and take into account that environmental signals such as light may affect the communications in an area. For example, a robotic platform may communicate with a controller or other robotic platforms using infrared light. Different light sources within the manufacturing facility may reduce the performance of these types of communications. For example, the bit error rate may increase to an undesirable level. In some cases, the receipt of transmissions of information that can be used may not be possible depending on the light conditions.

Thus, the illustrative embodiments provide a method and apparatus for evaluating a robotic system. This robotic system may include one or more robotic platforms. In one illustrative embodiment, a group of robotic platforms is controlled to perform operations in an operating area. Environmental signals are generated in the operating area. A response of the group of robotic platforms to an input is identified. A determination is made as to whether the response is a desired response.

Figure 1:
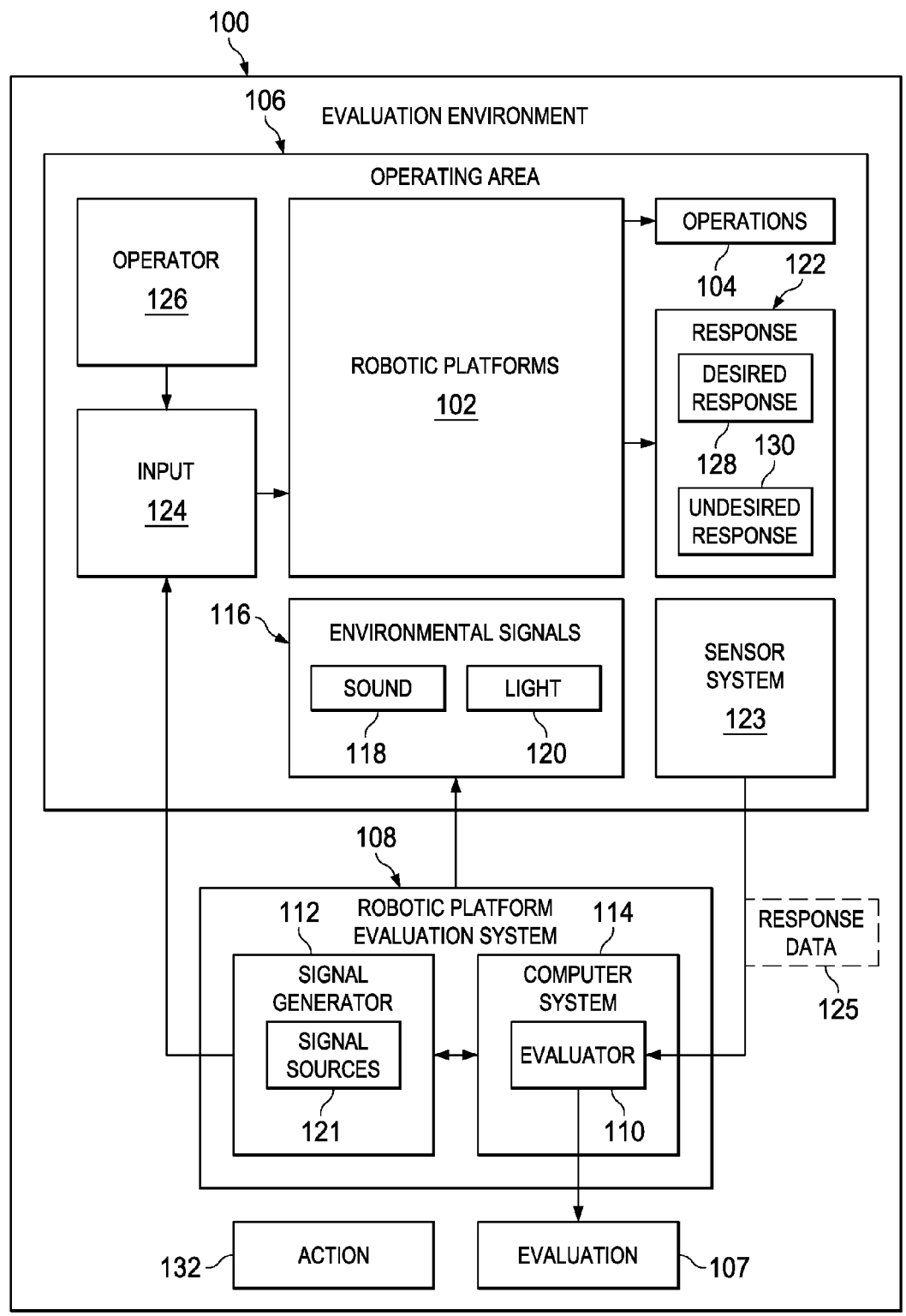
FIG. 1 is an illustration of a block diagram of an evaluation environment in accordance with an illustrative embodiment.

With reference now to figures and, in particular, with reference to FIG. 1, an illustration of a block diagram of an evaluation environment is depicted in accordance with an illustrative embodiment. In this depicted example, evaluation environment 100 is used to evaluate a group of robotic platforms 102.

A "group of," when used with reference items, means one or more items. For example, a group of robotic platforms 102 is one or more robotic platforms in robotic platforms 102. Robotic platforms 102 may include at least one of mobile robotic platforms or non-mobile robotic platforms. Robotic platforms 102 may include, for example, at least one of an inspection robot, a sensing robot, a communications robot, a robotic arm with an end effector, a transport robot, a fastener installation robot, or some other suitable type of robotic platform.

In this illustrative example, the group of robotic platforms 102 performs operations 104 in operating area 106. Operations 104 may take various forms. For example, the group of robotic platforms 102 may perform operations 104 for at least one of manufacturing, maintenance, inspection, or other types of operations.

Operating area 106 is any area in which the group of robotic platforms 102 may operate. For example, operating area 106 may be selected from at least one of a test area, a manufacturing area, an inspection area, a maintenance area, a hanger, a tarmac, or some other suitable area.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

In this illustrative example, evaluation 107 of the group of robotic platforms 102 is made using robotic platform evaluation system 108. Robotic platform evaluation system 108 comprises evaluator 110 and signal generator 112.

In this illustrative example, evaluator 110 is configured to facilitate evaluation 107 of the group of robotic platforms 102. Evaluator 110 may be implemented in software, hardware, firmware or a combination thereof. When software is used, the operations performed by evaluator 110 may be implemented in program code configured to run on a processor unit. When firmware is used, the operations performed by evaluator 110 may be implemented in program code and data and stored in persistent memory to run on a processor unit. When hardware is employed, the hardware may include circuits that operate to perform the operations in evaluator 110.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, evaluator 110 may be implemented in computer system 114. Computer system 114 is comprised of one or more computers. When more than one computer is present, those computers may communicate with each other using a communications medium such as a network.

As depicted, evaluator 110 may be used in evaluating the group of robotic platforms 102. For example, evaluator 110 may control the group of robotic platforms 102 to perform operations 104 in operating area 106. Evaluator 110 is also configured to generate environmental signals 116 in operating area 106. Environmental signals 116 may be generated by evaluator 110 through signal generator 112. Environmental signals 116 may be sound 118 and light 120 in this illustrative example. As depicted, signal generator 112 is comprised of a group of signal sources 121. The group of signal sources 121 may be stationary, mobile, or both.

For example, a signal source in the group of signal sources 121 may be a robotic platform, a drill, a sprayer, a window, a light, a laser tracker, an infrared emitter, an ultrasonic sound sensor, or some other source that may be present in operating area 106. In another illustrative example, the source maybe a source actually present in operating area 106 or may be a virtual source simulating a sound source for operating area 106.

Evaluator 110 identifies response 122 of the group of robotic platforms 102 to input 124. Response 122 is identified based on a presence of environmental signals 116 generated by signal generator 112 in this illustrative example. Response 122 may be identified by sensor system 123. Sensor system 123 may be located in the group of robotic platforms 102 or other locations in evaluation environment 100. Sensor system 123 generates response data 125 that may be used to identify response 122. For example, sensor system 123 may include at least one of a camera, an ultrasonic sensor, a laser tracker, or other suitable sensors. Sensor system 123 may also include processor units in the group of robotic platforms 102 or in other locations. Response data 125 in this case is response 122 generated from input 124.

In the illustrative example, input 124 may be generated in a number of different ways. For example, input 124 may be generated by signal generator 112. Input 124 may also be generated by operator 126.

Evaluator 110 also may be configured to determine whether response 122 to input 124 is desired response 128 or undesired response 130 in the illustrative example. Response 122 may be used to identify action 132 with respect to evaluation environment 100 in the illustrative example.

Input 124 is generated in operating area 106 during the operation of the group of robotic platforms 102 in operating area 106. Input 124 may take various forms. For example, input 124 may be selected from at least one of communications input, sensor input, or other suitable types of input.

For example, communications input may be audible instructions from a human operator. The audible instructions are instructions spoken by a human operator to one or more robotic platforms in the group of robotic platforms 102 to perform a particular action, task, or series of actions or tasks. For example, the human operator may give instructions to bring a particular component to the human operator. The audible instructions may be considered a type of input in input 124.

The sensor input may take various forms. For example, the sensor input may be sound signals to identify a direction, a distance, or both to a source of the sound signals. In another example, the sensor input may be information received from signals such as infrared signals in a wireless communications link.

For example, communications signals that may be in input 124 may be interfered with by environmental signals 116 in operating area 106. For example, a structure may block wireless communications signals, such as infrared light. In another example, reflections from an object in operating area 106 may interfere with infrared light carrying information in input 124 to the group of robotic platforms 102. Shadowing effects from objects, flashes from an arc welder, and changes in light through a window may result in light 120 with an absence of light 120 that may interfere with robotic platforms 102 receiving input 124. As yet another example, intermittent vibrations may be present on the floor in operating area 106. These intermittent vibrations are examples of environmental signals 116 that may result in sound 118 that interfere with sounds such as commands in input 124.

With these and other types of environmental signals 116, response 122 by robotic platforms 102 may not be desired response 128. Instead, undesired response 130 may occur.

In the illustrative example, if response 122 is undesired response 130, action 132 may be performed. Action 132 may reduce undesired response 130, increase desired response 128, or both, of the group of robotic platforms 102.

Action 132 may be for one or more robotic platforms in the group of robotic platforms 102. For example, action 132 may be performed on a robotic platform in the group of robotic platforms 102 and response 122 may be for some or all of the group of robotic platforms 102.

In other illustrative examples, action 132 may not be performed on any of the group of robotic platforms 102. Instead, action 132 may be performed on other objects in operating area 106 to reduce undesired response 130.

As depicted, action 132 is selected from at least one of changing a configuration of operating area 106, selecting a different group of robotic platforms, or adding objects in the operating area to reduce undesired response 130, increase desired response 128, or both.

The change in the configuration of operating area 106 may comprise various types of changes. For example, obstacles or instructions may be removed. Systems may be implemented to reduce effects of environmental signals 116 on the group of robotic platforms 102.

For example, effects from shadowing, flashes of light, or other effects from light 120 may be reduced through removing or changing the location of the source of light 120 that interferes with the group of robotic platforms 102 performing operations 104 with a desired response 128. For example, flashes of light from an arc welder may result in action 132 being the arc welder within operating area 106. Vibrations from sources outside of operating area 106 such as a truck result in rerouting traffic during certain periods of time to avoid interference with operations 104 by the group of robotic platforms 102.

Thus, robotic platform evaluation system 108 is configured to facilitate or perform evaluation 107 of the group of robotic platforms 102 in operating area 106. In the illustrative example, evaluation 107 may be performed as the group of robotic platforms 102 perform operations 104 or may be performed at a later time using data collected from the group of robotic platforms 102 performing operations 104.

For example, evaluation 107 may include determining whether response 122 generated by the group of robotic platforms 102 is desired response 128 or undesired response 130. In this manner, an identification of whether environmental signals 116 may affect the manner in which the group of robotic platforms 102 performs operations 104 in operating area 106 may be identified. This identification may be performed prior to configuring or reconfiguring an area such as a manufacturing area, a maintenance area, an inspection area, or some other suitable area. In these illustrative examples, operating area 106 may be the area in which the configuration is to be performed or may be a test area.

Figure 2:
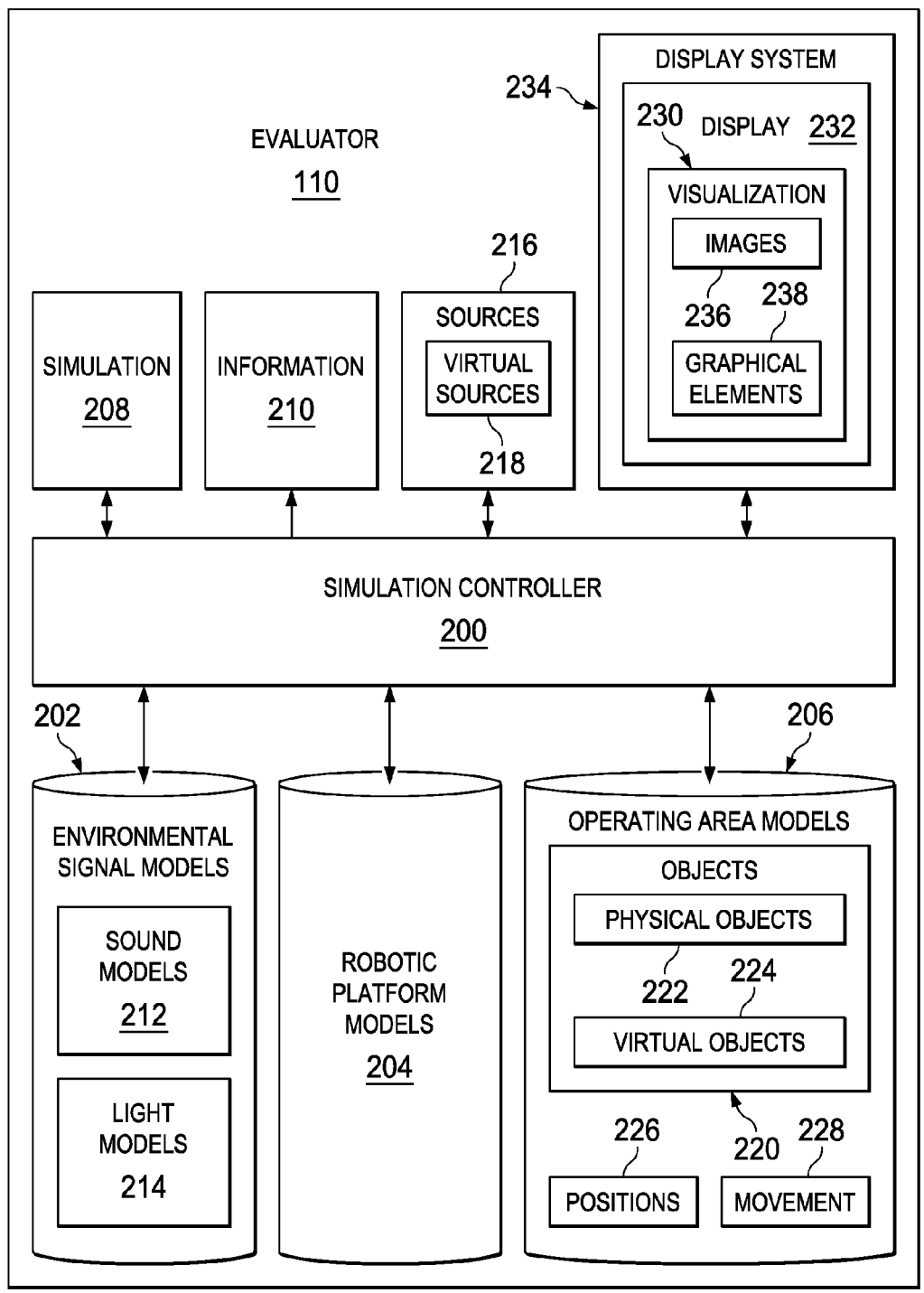
FIG. 2 is an illustration of a block diagram of an evaluator in accordance with an illustrative embodiment.

With reference next to FIG. 2, an illustration of a block diagram of an evaluator is depicted in accordance with an illustrative example. In this illustration, evaluator 110 includes simulation controller 200, environmental signal models 202, robotic platform models 204, and operating area models 206.

Simulation controller 200 in evaluator 110 is configured to run simulation 208 for the group of robotic platforms 102 in evaluation environment 100 in FIG. 1. As depicted, simulation controller 200 is configured to control a group of robotic platforms 102 to perform operations in an operating area. In particular, simulation controller 200 is configured to identify a group of environmental signal models 202 and control signal generator 112 to generate at least a portion of environmental signals 116 in FIG. 1 based on the group of environmental signal models 202 identified. Environmental signal models 202 provide information needed to generate environmental signals 116.

In the illustrative example, simulation controller 200 may control the generation of environmental signals 116 such that the signals are dynamic. In other words, environmental signals 116 may change. The various parameters for environmental signals 116 that may change include location, direction, intensity, frequency, duration, and other suitable parameters for environmental signals 116.

For example, simulation controller 200 may send information 210 to the group of robotic platforms 102 to perform operations 104 for simulation 208. Information 210 may be at least one of a program, a command, data, an image, an instruction, a task, or other suitable information that may be used by the group of robotic platforms 102 to perform operations 104 in operating area 106 in FIG. 1 for simulation 208. In some illustrative examples, information 210 may also include input 124 in FIG. 1.

As depicted, environmental signal models 202 may include different types of models that may be used to generate environmental signals 116 with signal generator 112. For example, environmental signal models 202 may include sound models 212 and light models 214 as well as any other types of models that may be used to generate environmental signals 116.

Sound models 212 provide information that may be used to generate sound 118 in environmental signals 116 in FIG. 1. Sound models 212 may include information used to generate sound 118. The information may be parameters used by signal generator 112 to generate sound 118. In another example, sound models 212 may include recordings of sound 118. The information may identify movement of a sound source in signal sources 121 in FIG. 1.

In the illustrative example, light models 214 may be used to generate light 120 in environmental signals 116. Light models 214 may include information used to generate light 120. The information may be parameters used by signal generator 112 to generate light 120 in FIG. 1. For example, the information may identify a particular light source in signal sources 121 that should be turned on. The information may also identify movement of a light source.

In this illustrative example, environmental signal models 202 may be used to simulate a group of sources 216 of environmental signals 116 in simulation 208. In the illustrative example, the group of sources 216 is a group of virtual sources 218.

In other words, the group of sources 216 is not physically present in operating area 106. Instead, signal generator 112 generates environmental signals 116 that the group of sources 216 would generate if the group of sources 216 were actually present in operating area 106. In other words, environmental signal models 202 may be used to generate environmental signals 116 for the group of virtual sources 218 that are not actually present in operating area 106.

Thus, a source in sources 216 of environmental signals 116 may be both the actual source or a modeled source. In other words, the actual source may be the actual object or device that generates the particular environmental signal. The modeled source may be a virtual source in virtual sources 218 that generates an environmental signal in environmental signals 116 using a model in environmental signal models 202.

In this manner, the effect of environmental signals 116 on the group of robotic platforms 102 may be evaluated without requiring an entire set up for operating area 106. As a result, evaluation 107 in FIG. 1 of the group of robotic platforms 102 may be performed more quickly, with less expense, or both when virtual sources 218 are simulated to generate environmental signals 116 within operating area 106 by signal generator 112.

As depicted, robotic platform models 204 may be used by simulation controller 200 to perform simulation 208. In particular, robotic platform models 204 may be used to identify information 210 to send to robotic platforms for use in performing operations 104.

For example, robotic platform models 204 may include weight, dimensions, commands, programs, capabilities, parameters describing performance, and other suitable information about robotic platforms 102.

As depicted, operating area models 206 identifies the location of objects 220 within operating area 106. Objects 220 include at least one of physical objects 222 or virtual objects 224. For example, physical objects 222 include the group of robotic platforms 102 as well as any other physical objects actually present in operating area 106. For example, physical objects 222 may include tables, platforms, tools, lighting, power generators, supplies, barrels, and other objects that may be present in operating area 106.

Virtual objects 224 include objects that are not actually present in operating area 106. Virtual objects 224 may include the same type of objects as those for physical objects 222.

At least one of a group of physical objects 222 or a group of virtual objects 224 may be sources 216 for environmental signals 116. In the illustrative example, objects 220 in operating area models 206 may be used to identify sources 216 and, in particular, virtual sources 218 for environmental signals 116.

Additionally, operating area models 206 may identify positions 226 of objects. A position in positions 226 includes a location in two or three dimensions. The position may also include an orientation of the object. Also, operating area models 206 also may define movement 228 of objects 220 including at least one of the group of robotic platforms 102, sources 216, or other objects.

With the identification of objects 220 and positions 226 of objects 220 in operating area 106, simulation 208 of simulation controller 200 may control robotic platforms 102 to perform operations 104. Additionally, simulation controller 200 also may control signal generator 112 to generate environmental signals 116 for evaluating the group of robotic platforms 102. Control of signal generator 112 may include at least one of location, orientation, propagation, and other parameters for environmental signals 116 over time. In one illustrative example, environmental signals 116 are from one or more virtual sources, and parameters for environmental signals 116 may change over time.

In this illustrative example, simulation controller 200 also may provide visualization 230 of simulation 208 in display 232 on display system 234. Display system 234 is a hardware system and may include software. In this illustrative example, display system 234 may be comprised of a group of display devices.

Display 232 for visualization 230 of simulation 208 may be generated using at least one of images 236 and graphical elements 238. For example, sensor system 123 may generate images 236 of operating area 106. Images 236 may include the group of robotic platforms 102 performing operations 104. Graphical elements 238 may provide visualization 230 for virtual objects 224 in simulation 208. Additionally, graphical elements 238 may provide visualization 230 of environmental signals 116. For example, graphical elements 238 may be used to visually show propagation fields for environmental signals 116.

As depicted, graphical elements 238 may be displayed in conjunction with images 236. This display may provide an augmented reality view of operating area 106. An augmented reality view is a live direct view or indirect view of operating area 106 in which images of real physical objects are supplemented by computer generated elements. The elements may be graphical elements 238. Other examples of elements include, for example, sound, video, text, or other elements.

In some illustrative examples, images 236 may be generated using sensor data that does not include images from sensor system 123. In this type of example, visualization 230 is a virtual reality display of operating area 106.

For example, simulation controller 200 may be configured to display the operation of the group of robotic platforms 102 in operating area 106 on display system 234. Further, simulation controller 200 may be configured to display visualization 230 of environmental signals 116 in operating area 106 in display 232 on display system 234. Environmental signals 116 are displayed in visualization 230 using graphical elements 238 in this illustrative example.

In the illustrative example, visualization 230 may be viewed on display system 234 while simulation 208 is run by simulation controller 200. In other words, visualization 230 may be viewed as robotic platforms 102 perform operations 104 in the presence of environmental signals 116. In other illustrative examples, visualization 230 may be viewed on display system 234 and at a later time after simulation 208 has been run.

In this manner, the effect of environmental signals 116 on the group of robotic platforms 102 may be evaluated without requiring an entire set up for operating area 106. As a result, evaluation 107 of the group of robotic platforms 102 may be performed more quickly, with less expense, or both when virtual sources 218 are simulated to generate environmental signals 116 within operating area 106 by signal generator 112.

Figure 3:
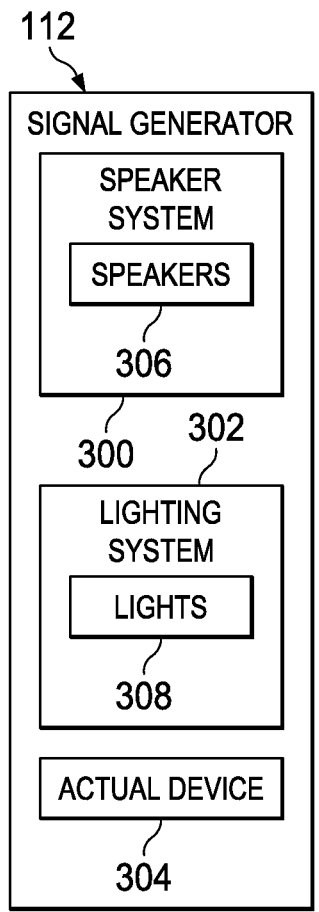
FIG. 3 is an illustration of a block diagram of a signal generator in accordance with an illustrative embodiment.

With reference now to FIG. 3, an illustration of a block diagram of a signal generator is depicted in accordance with an illustrative embodiment. In this illustrative example, an example of devices that may be used in signal generator 112 to generate environmental signals 116 in FIG. 1 is shown.

In the illustrative example, signal generator 112 may include a number of different components. As depicted, signal generator 112 includes at least one of speaker system 300, lighting system 302, actual device 304, or some other suitable source of environmental signals 116.

Speaker system 300 is comprised of a group of speakers 306. The group of speakers 306 may be placed in locations that correspond to sources 216 and, in particular, to virtual sources 218 in FIG. 2 for environmental signals 116.

For example, a speaker in the group of speakers 306 may be placed in the location where a piece of equipment such as a drill is operated in operating area 106. The drill may generate sound signals to simulate the operation of the drill in the particular location in operating area 106 in FIG. 1.

In other illustrative examples, the group of speakers 306 may be placed in various locations in operating area 106 that do not correspond with the locations of sources 216 of environmental signals 116. With this type of configuration, the group of speakers 306 may generate a sound field in which the sound signals are proceeding to originate from source locations other than those of the group of speakers 306. Sound localization techniques maybe used to generate the sound such that the robot sensor can determine the direction and distance of the sound source emulated by the speakers. In other illustrative examples, other techniques such as, for example, sound localization techniques maybe used to generate the sound such that a sensor in a robotic platform can identify the direction, distance, or both, of the sound source emulated by the group of speakers 306.

As depicted, lighting system 302 includes a group of lights 308. The group of lights 308 may be located in locations corresponding to sources 216. In the illustrative example, the group of lights 308 includes at least one of an incandescent light, a halogen light, a fluorescent light, a light emitting diode, a laser, an infrared emitter, or other suitable sources of light for generating light signals in environmental signals 116.

In the illustrative example, actual device 304 may be the actual source of environmental signals 116 instead of another device that simulates environmental signals. For example, actual device 304 may be a drill that generates sound signals. In another example, an actual device may be a robotic platform that generates sound signals, light signals, or both as a source in sources 216.

As depicted, signal generator 112 may include any combination of these sources for environmental signals 116. In this manner, signal generator 112 may be used to generate environmental signals 116 for virtual objects 224 in objects 220 that may be present for simulation 208 in FIG. 2 of operating area 106.

Figure 4:
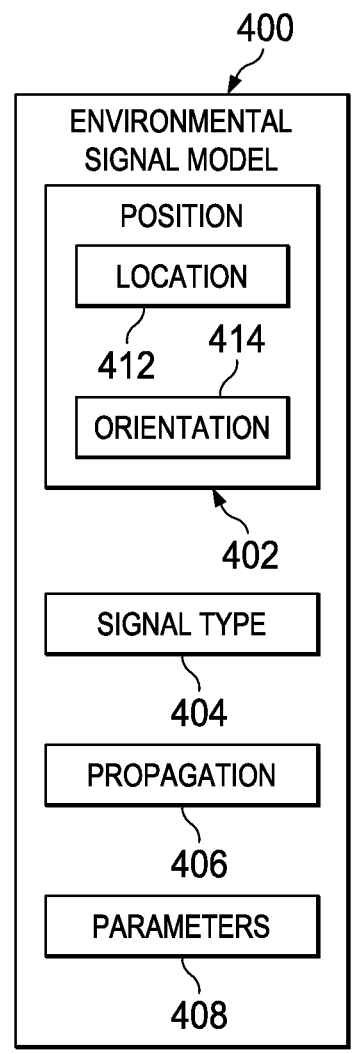
FIG. 4 is an illustration of a block diagram of an environmental signal model in accordance with an illustrative embodiment.

Turning now to FIG. 4, an illustration of a block diagram of an environmental signal model is depicted in accordance with an illustrative embodiment. In this depicted example, environmental signal model 400 is an example of an environmental signal model in environmental signal models 202 in FIG. 2. As depicted, environmental signal model 400 has a number of different components. In this illustrative example, environmental signal model 400 includes position 402, signal type 404, propagation 406, and parameters 408. Of course, other types of information also may be included depending the particular implementation.

As depicted, position 402 identifies the position of a source in sources 216 in operating area 106 to generate environmental signals 116 as described in FIG. 2. In this illustrative example, position 402 may include location 412 of the source. Additionally, position 402 also may include orientation 414 of the source.

In this illustrative example, signal type 404 identifies the type of environmental signal. For example, signal type 404 may be selected from at least one of sound, light, or any other suitable type of signal that may be of interest.

Propagation 406 identifies the manner in which the signals propagate. For example, propagation 406 may identify the propagation as a sphere, a cone, a beam, or some other volume in which the signals may propagate.

In the illustrative example, parameters 408 may identify various parameters for a particular type of signal. For example, parameters 408 may include a frequency, amplitude, a phase, or other suitable parameters.

Figure 5:
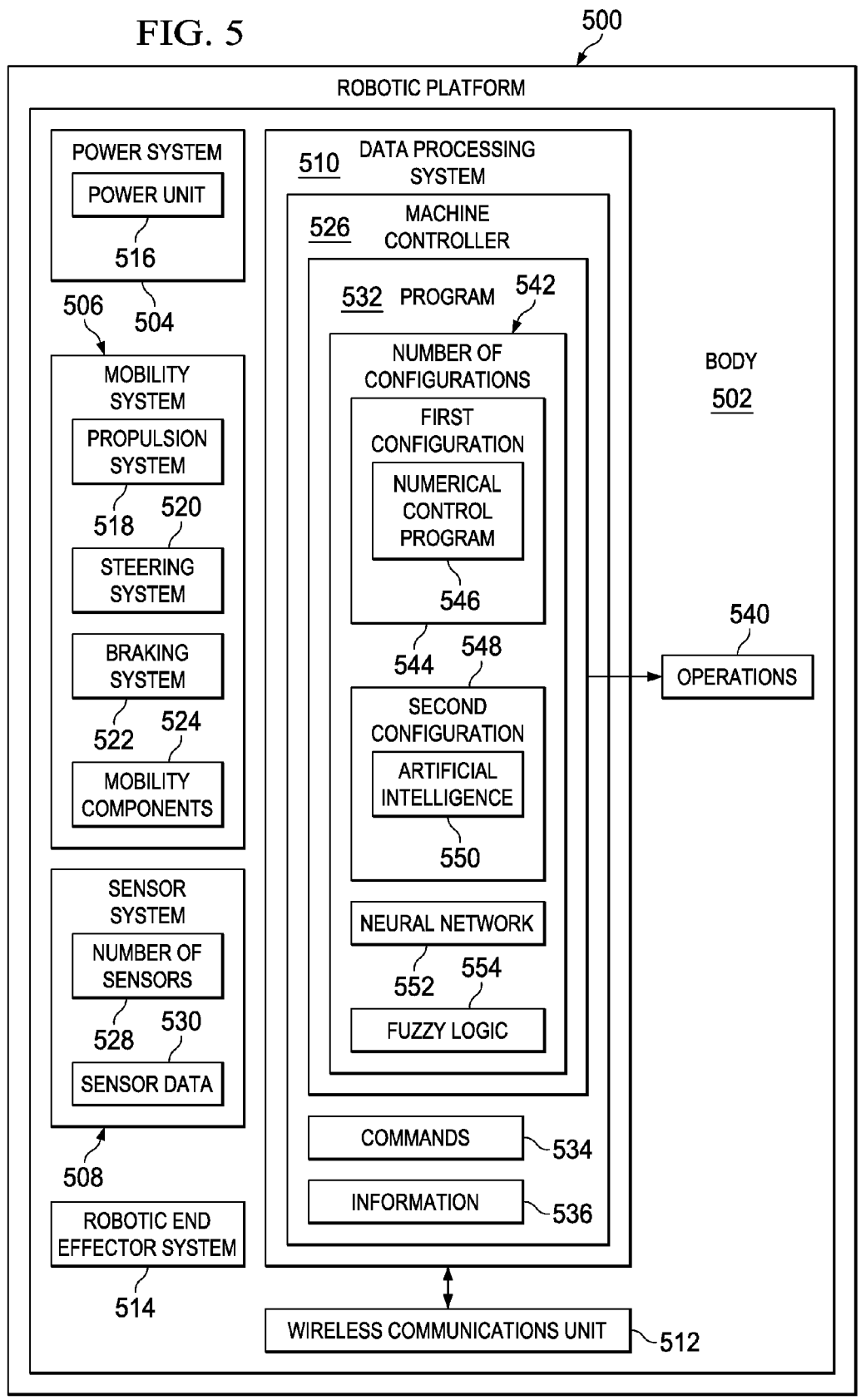
FIG. 5 is an illustration of a block diagram of a robotic platform in accordance with an illustrative embodiment.

With reference now to FIG. 5, an illustration of a block diagram of a robotic platform is depicted in accordance with an illustrative embodiment. Robotic platform 500 may be an example of one manner in which one or more robotic platforms in robotic platforms 102 in FIG. 1 may be implemented.

Robotic platform 500 may include, without limitation, body 502, power system 504, mobility system 506, sensor system 508, data processing system 510, wireless communications unit 512, robotic end effector system 514, and/or other suitable components.

Body 502 may provide a structure, housing, or both for whichever of the different components may be physically associated with robotic platform 500. When one component is "physically associated" with another component, the association is a physical association in the depicted examples. For example, a first component may be considered to be physically associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both.

Power system 504 is configured to provide power to operate robotic platform 500. Power system 504 may generate power using power unit 516. Power unit 516 may be rechargeable, removable, replaceable, or some combination thereof. For example, power unit 516 may be a fuel cell, a battery, or some other suitable components.

In some illustrative examples, power unit 516 may be connected to a power source using a cable. In other illustrative examples, power unit 516 may receive power wirelessly. For example, power unit 516 may be an inductive power system.

Mobility system 506 may provide mobility for robotic platform 500. With this component, robotic platform 500 is a mobile robotic platform. Mobility system 506 may take various forms. Mobility system 506 may include, for example, without limitation, propulsion system 518, steering system 520, braking system 522, and mobility components 524. In these examples, propulsion system 518 may move robotic platform 500.

Propulsion system 518 may be an electrically controlled propulsion system. Propulsion system 518 may be, for example, without limitation, an internal combustion engine, an electric engine, or some other suitable propulsion system.

Steering system 520 may control the direction or steering of robotic platform 500 in response to commands received from machine controller 526 in data processing system 510. Steering system 520 may be, for example, without limitation, an electrically controlled hydraulic steering system, an electrically driven rack and pinion steering system, a differential steering system, or some other suitable steering system.

Braking system 522 may slow down and stop robotic platform 500. Braking system 522 may be an electrically controlled braking system. This braking system may be, for example, without limitation, a hydraulic braking system, a friction braking system, or some other suitable braking system that may be electrically controlled.

Mobility components 524 may provide robotic platform 500 with the capability to move in a number of directions. Mobility components 524 may be at least one of wheels, tracks, feet, rotors, propellers, wings, or other suitable components.

Sensor system 508 may include number of sensors 528 and sensor data 530. For example, number of sensors 528 may include at least one of a camera, a scanner, an electromechanical fatigue sensor, a microelectromechanical system (MEMS) device, or some other suitable type of sensor. Sensor data 530 may be information collected by number of sensors 528.

Robotic end effector system 514 may be a group of robotic end effectors. The group of robotic end effectors may be robotic peripherals, robotic accessories, robot tools or robotic tools, end-of-arm tooling, end-of-arm devices, or other suitable components. Robotic end effector system 514 may include at least one of an automatic tool, a gripper, a deburring tool, a collision sensor, a paint sprayer, an arc welding gun, a rotary joint, a vacuum cup, a three-jaw chuck, a nipper, a high-speed spindle, a drill, a fastener installer, or other suitable tools or components.

As depicted, data processing system 510 controls the operation of robotic platform 500 using machine controller 526. In this illustrative example, machine controller 526 is configured to run program 532 and transmit commands 534 in these examples. Program 532 may be received from a remote location or may be stored on data processing system 510. Program 532 may be received through wireless communications unit 512.

In these illustrative examples, wireless communications unit 512 is configured to transfer information 536. Information 536 may include program 532, commands 534, data, images, and other suitable types of information. Information 536 is transferred between robotic platform 500 and other robotic platforms, computers, or other components.

In one illustrative example, instructions may be received and used by program 532 to operate robotic platform 500 performing operations 540. These instructions may provide parameters for performing an operation or may provide a portion of the parameters for performing an operation. In other illustrative examples, these instructions may not provide parameters for performing an operation and may allow program 532 to select all or a portion of these parameters for performing the operation.

Program 532 may have number of configurations 542 for controlling the performance of operations 540. Each of number of configurations 542 may include at least one of a number of processes, programming code, a number of algorithms, a number of tools, a number of controls, or a number of other suitable elements for a configuration of program 532.

For example, without limitation, first configuration 544 of program 532 may use numerical control program 546. In these examples, robotic platform 500 may be a numerically-controlled machine. In particular, numerical control program 546 may be run to control an operation in operations 540 based on instructions received.

As one illustrative example, numerical control program 546 for robotic platform 500 may receive instructions to drill holes in a location. In other examples, numerical control program 546 may be run to capture an image of a workpiece at a location on a workstation. In these examples, numerical control program 546 may perform decision-making for robotic platform 500.

In other illustrative examples, numerical control program 546 may be configured to control operations 540 based on a set of parameters. These parameters may take into account at least one of power, speed, efficiency, safety, situational awareness, or some other suitable parameters. Numerical control program 546 may be run with some amount of decision-making to perform operations 540 within the set of parameters.

As another example, second configuration 548 of program 532 may use artificial intelligence 550 to control operations 540. Artificial intelligence 550 may provide robotic platform 500 with capabilities selected from at least one of decision-making, deduction, reasoning, problem-solving, planning, learning, or other capabilities. Decision-making may involve using a set of rules to perform tasks.

For example, without limitation, program 532 may receive instructions for robotic platform 500 to attach two components to each other based on a policy. A policy is one or more rules and may include information and data needed to apply the rules to different situations.

Artificial intelligence 550 may be used to perform this operation instead of numerical control program 546. Artificial intelligence 550 may be configured to make decisions based on the policy.

In another example, instructions may be received by program 532 for robotic platform 500 to drill holes in a structure. Artificial intelligence 550 may be used to select parameters of this drilling operation. These parameters may include at least one of a pattern, a location, a size, or other parameters for the drilling operation. In this example, artificial intelligence 550 may select the parameters for the drilling operation based on one or more policies.

With second configuration 548 for program 532, robotic platform 500 may take the form of an autonomous robotic platform. In other words, robotic platform 500 may have a desired level of autonomy using artificial intelligence 550 to perform operations 540 as compared to using numerical control program 546. For example, without limitation, artificial intelligence 550 may perform operations 540 with little or no input or commands from external sources.

In other configurations of number of configurations 542 of program 532, program 532 may comprise neural network 552, fuzzy logic 554, or other suitable systems. Neural network 552 may be an artificial neural network in this example. In these illustrative examples, neural network 552 and fuzzy logic 554 may allow robotic platform 500 to perform operations 540 with a desired level of autonomy.

In some illustrative examples, second configuration 548 of program 532 may comprise neural network 552 and fuzzy logic 554 to provide artificial intelligence 550. In some illustrative examples, a configuration in number of configurations 542 for program 532 may include numerical control program 546, neural network 552, and fuzzy logic 554.

Data processing system 510 is configured to receive sensor data 530 from sensor system 508. Sensor data 530 may be used by machine controller 526 to perform operations. Additionally, sensor data 530 also may be sent to another robotic platform, a computer, or other device using wireless communications unit 512.

The illustration of robotic platform 500 in FIG. 5 is only provided as one manner in which robotic platform 500 may be implemented. This illustration is not meant to limit the manner in which other robotic platforms may be implemented. For example, robotic platform 500 may not have mobility system 506 in some implementations. As another example, machine controller 526 may be unnecessary. Machine controller 526 may be unnecessary if data processing system 510 directly receives program 532 and commands 534 from a source located remotely from robotic platform 500. In yet other illustrative examples, robotic platform 500 may include additional systems not depicted here for operations such as, without limitation, inspection, maintenance, surveillance, search and rescue, or any other suitable operation or mission.

The illustration of evaluation environment 100 and the different components in FIGS. 1-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, evaluation 107 also may include determining other types of performance of the group of robotic platforms 102. The other types of performance may include speed, efficiency, accuracy or some other metric for which operations 104 are performed. Thus, one or more actions in addition to action 132 may be performed to take into account these and other performance metrics for the group of robotic platforms 102.

Further, environmental signals 116 may take other forms in addition to or in place of sound 118 and light 120. For example, environmental signals 116 may be vibrations. Vibration models may be included in environmental signal models 202 for use by signal generator 112 to generate vibrations.

With visualization 230, an operator may identify action 132. In some illustrative examples, action 132 may be suggested by simulation controller 200 depending on the level of intelligence of simulation controller 200.

For example, action 132 may be identified by simulation controller 200 when using a system that has capabilities selected from at least one of decision-making, deduction, reasoning, problem-solving, planning, learning, or other capabilities. For example, an artificial intelligence system, a neural network, fuzzy logic, or other suitable system may be used.

As another example, signal generator 112 may include other components in addition to or in place of the ones illustrated in FIG. 3. For example, signal generator 112 also may include a vibration system to generate vibrations. The vibration system may be implemented using various devices such as a thumper, a transducer, or other suitable device.

As yet another illustrative example, the effects of environmental signals 116 may extend to output generated by the robotic platforms 102 in addition to or in place of input 124. For example, a robotic platform in the group of robotic platforms 102 may generate audible messages. Audible messages may be information such as confirmation in the performance of the command, a warning, or some other suitable type of message. These audible messages may be voice messages, sound, or other suitable types of audible messages.

Environmental signals 116 may interfere with the generation of audible messages by the group of robotic platforms 102. For example, operator 126 may be unable to hear or understand the messages if sound 118 interferes with those messages being generated. For example, sound 118 in operating area 106 may make messages generated by the group of robotic platforms 102 unintelligible or unheard.

As a result, evaluation 107 may also cover output by the group of robotic platforms 102 in addition to or in place of input 124. Action 132 may be an action to provide the desired response 128 with respect to the output generated by the group of robotic platforms 102.

Figure 6:
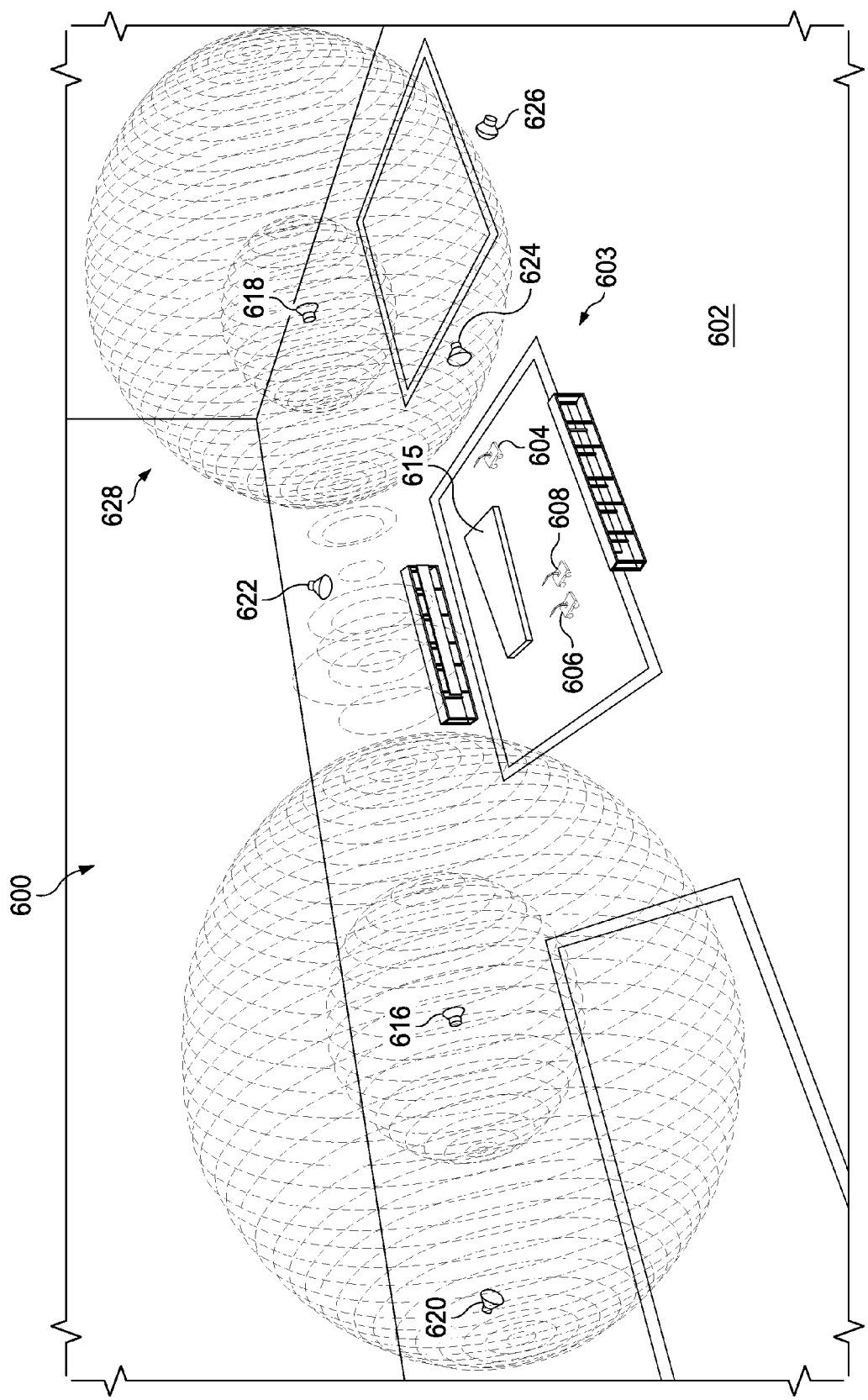
FIG. 6 is an illustration of a visualization of sound signals in an operating area in accordance with an illustrative embodiment.
Figure 7:
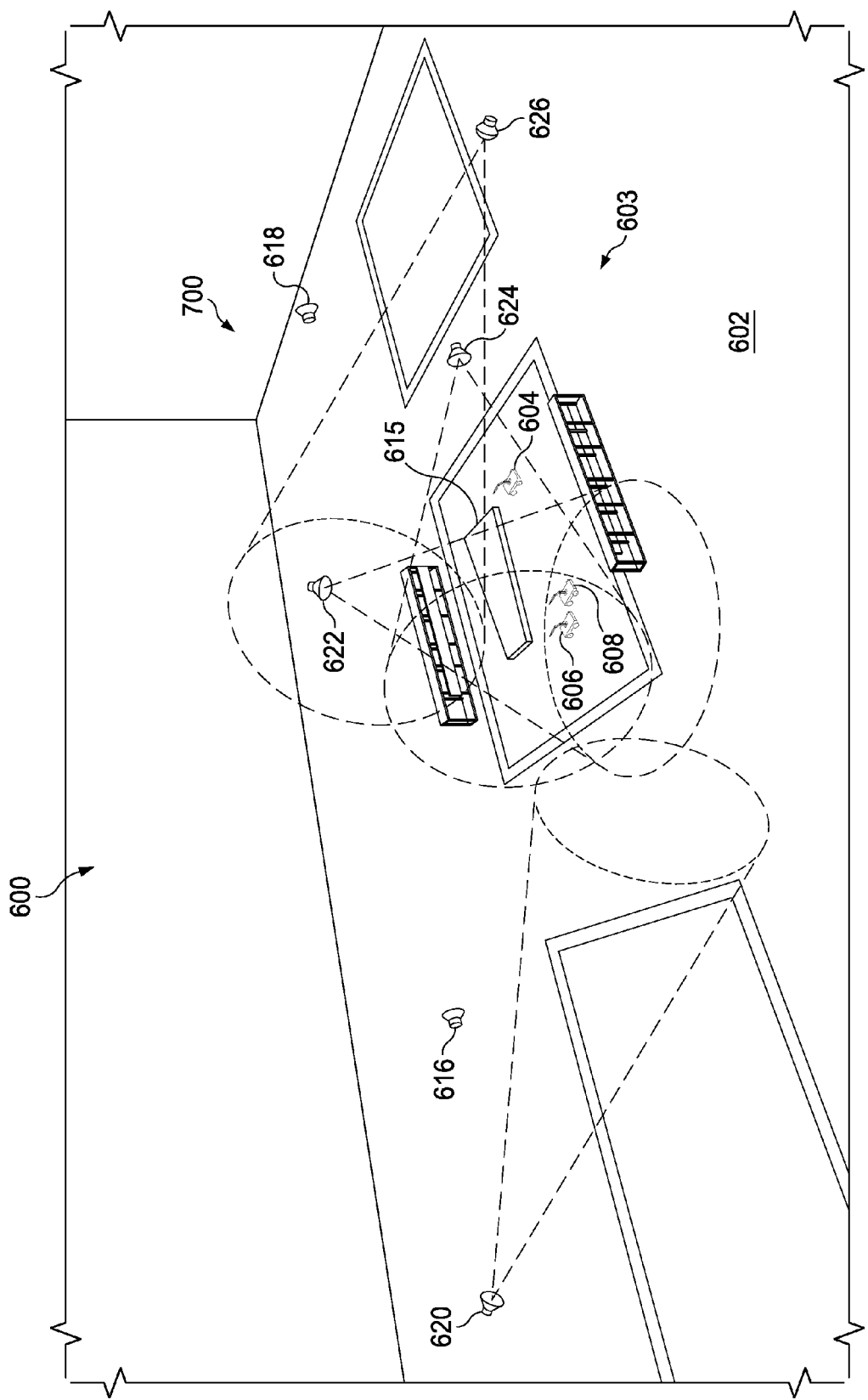
FIG. 7 is another illustration of a visualization of sound signals in an operating area in accordance with an illustrative embodiment.

The examples of a visualization of a simulation performed for a group of robotic platforms in an operating area are shown in FIGS. 6 and 7. These figures provide one example of the manner in which a visualization may be displayed using augmented reality.

With reference first to FIG. 6, an illustration of a visualization of sound signals in an operating area is depicted in accordance with an illustrative embodiment. In this illustrative example, display 600 is an example of display 232 on display system 234 providing visualization 230 of simulation 208 in FIG. 2.

In this figure, operating area 602 shown. A group of robotic platforms 603 is present in operating area 602. In this illustrative example, the group of robotic platforms 603 includes robotic platform 604, robotic platform 606, and robotic platform 608. As depicted, the group of robotic platforms 603 performs operations to assemble wing 615.

In this illustrative example, the group of robotic platforms 603 and wing 615 are shown as live images in display 600. Additionally, environmental signals in the form of sound and light are present in operating area 602. These speakers may represent sound sources that can be either static or mobile.

As depicted, a speaker system including speaker 616 and speaker 618 are present in operating area 602. Speaker 616 and speaker 618 are configured to generate sound signals for sound sources such as virtual sound sources in operating area 602. These speakers may represent sound sources that can be either static or mobile.

Also present in operating area 602 is a lighting system. The lighting system is configured to generate light for virtual sources.

The lighting system includes light 620, light 622, light 624, and light 626. These lights are configured to generate light signals for light sources such as virtual light sources in operating area 602. These lights may represent sources of light and may be present in operating area 602 while the group of robotic platforms 603 performs operations.

In the illustrative example, the visualization of sound signals is shown using graphical elements 628. During operation, the group of robotic platforms 603 is exposed to environmental signals in the form of sound signals as shown visually through graphical elements 628. Graphical elements 628 are used to provide an augmented reality view for a viewer.

Graphical elements 628 visually show a field through which sound signals propagate. The display of graphical elements 628 provides an augmented reality to the viewer to more easily see the propagation of sound signals. In this manner, the viewer of display 600 may see areas in operating area 602 in which the sound signals may affect the operation of the group of robotic platforms 603.

With reference now to FIG. 7, another illustration of a visualization of sound signals in an operating area is depicted in accordance with an illustrative embodiment. In this illustrative example, display 600 includes graphical elements 700. Graphical elements 700 are configured to illustrate the areas in which light signals are transmitted by light 620, light 622, light 624, and light 626. In this example, graphical elements 700 take the form of dashed lines showing the propagation of light signals in the form of light beams. In this manner, a viewer may visualize the area in which light from the flight sources may affect the operation of the group of robotic platforms 603.

The illustrations of displays providing visualizations of robotic platforms performing operations in FIGS. 6 and 7 are not meant to limit the manner in which visualizations may be displayed. For example, these displays may be presented while the robotic platforms perform operations for a later time depending on the particular implementation.

Additionally, the visualizations displayed for environmental signals such as sound and light may be provided with graphical elements in the same display. In other illustrative examples, other types of environmental signals may be displayed using graphical elements. For example, vibrations and their propagation may be shown in these displays. As another example, other information may be displayed in addition to or in place of the graphical elements for visualizing environmental signals. For example, graphical elements such as text, charts, or other suitable graphical elements may be used to indicate whether the response of the robotic platforms in response to inputs are desired responses, undesired responses, or some combination thereof.

As another example, graphical elements for both sound signals and light signals may be shown in the same display. Further, graphical elements also may show sound signals and light signals that may be generated by the group of robotic platforms 603.

Figure 8:
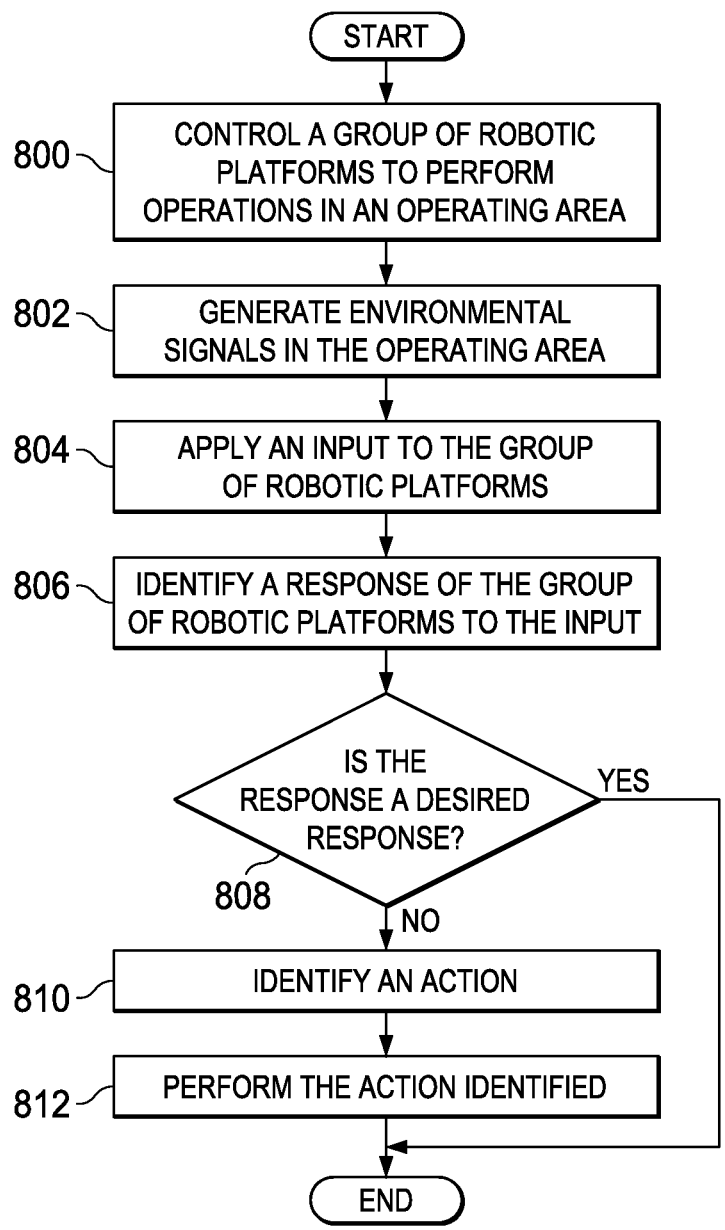
FIG. 8 is an illustration of a flowchart of a process for evaluating a group of robotic platforms in accordance with an illustrative embodiment.

Turning now to FIG. 8, an illustration of a flowchart of a process for evaluating a group of robotic platforms is depicted in accordance with an illustrative embodiment. The process illustrated in FIG. 8 may be implemented in evaluation environment 100 in the form of evaluation 107 of robotic platforms 102 in FIG. 1. In particular, the processes may provide information used for evaluation 107 and may provide information needed to identify action 132 in FIG. 1. The different operations in the flowchart are implemented in robotic platform evaluation system 108 in FIG. 1 in this illustrative example.

The process begins by controlling a group of robotic platforms to perform operations in an operating area (operation 800). The group of robotic platforms may be some or all of the robotic platforms in the operating area. In other words, the processes may only control some of the robotic platforms.

The process then generates environmental signals in the operating area (operation 802). The environmental signals may be generated by identifying a group of environmental signal models. A signal generator may then be controlled to generate at least a portion of the environmental signals based on the group of environmental signal models identified.

The process may apply an input to the group of robotic platforms (operation 804). In some illustrative examples, operation 804 may be performed by human operators in addition to or in place of the components in robotic platform evaluation system 108.

The process then identifies a response of the group of robotic platforms to the input (operation 806). The response may be identified from the sensors in evaluation environment 100. In some illustrative examples, these sensors may be in various locations in evaluation environment 100. These sensors may detect the response of the robotic platforms performing operations when the input is applied to the group of robotic platforms. Additionally, the response may be identified from information on how robotic platforms 102 perform operations 104 in response to input 124 in FIG. 1.

A determination is made as to whether the response is a desired response (operation 808). Whether the response is a desired response may be made by comparing a response to a policy. The policy is a group of rules that may include data or other information needed to apply the rules to the response.

An action is identified if the response is not a desired response (operation 810). The process then performs the action identified (operation 812), with the process terminating thereafter. With reference again to operation 808, the process terminates without identifying an action if the response is a desired response.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
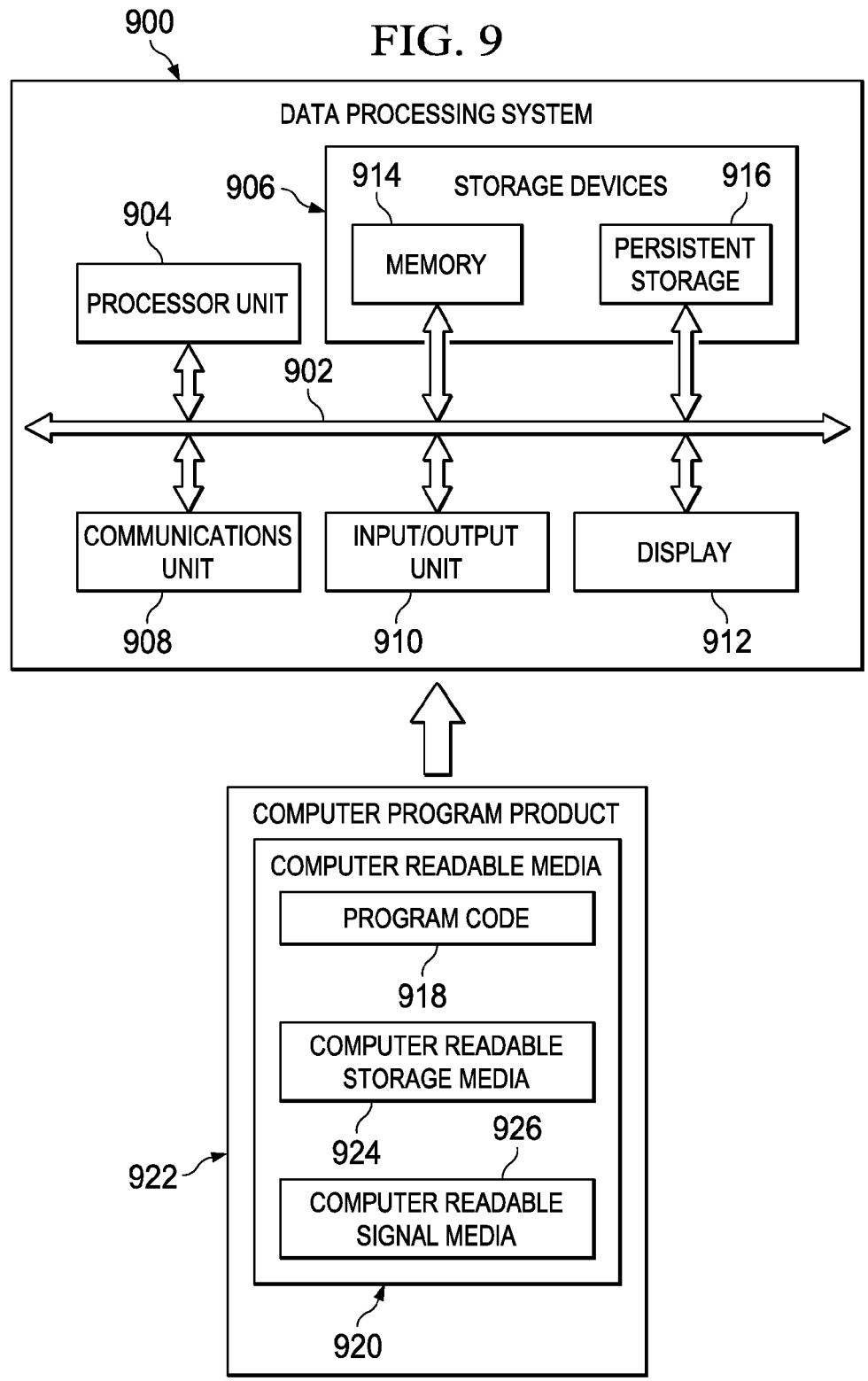
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computers in computer system 114 in FIG. 1. Additionally, data processing system 900 is an example of an implementation for data processing system 510 in robotic platform 500 in FIG. 5. As depicted, data processing system 900 includes communications framework 902, which provides communications between processor unit 904, storage devices 906, communications unit 908, input/output unit 910, and display 912. In some cases, communications framework 902 may be implemented as a bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer readable program code and may be read and executed by one or more processors in processor unit 904.

In these examples, program code 918 is located in a functional form on computer readable media 920, which is selectively removable, and may be loaded onto or transferred to data processing system 900 for execution by processor unit 904. Program code 918 and computer readable media 920 together form computer program product 922. In this illustrative example, computer readable media 920 may be computer readable storage media 924 or computer readable signal media 926.

Computer readable storage media 924 is a physical or tangible storage device used to store program code 918 rather than a medium that propagates or transmits program code 918. Computer readable storage media 924 may be, for example, without limitation, an optical or magnetic disk or a persistent storage device that is connected to data processing system 900.

Alternatively, program code 918 may be transferred to data processing system 900 using computer readable signal media 926. Computer readable signal media 926 may be, for example, a propagated data signal containing program code 918. This data signal may be an electromagnetic signal, an optical signal, and/or some other type of signal that can be transmitted over physical and/or wireless communications links.

The illustration of data processing system 900 in FIG. 9 is not meant to provide architectural limitations to the manner in which the illustrative embodiments may be implemented. The different illustrative embodiments may be implemented in a data processing system that includes components in addition to or in place of those illustrated for data processing system 900. Further, components shown in FIG. 9 may be varied from the illustrative examples shown.

Figure 10:
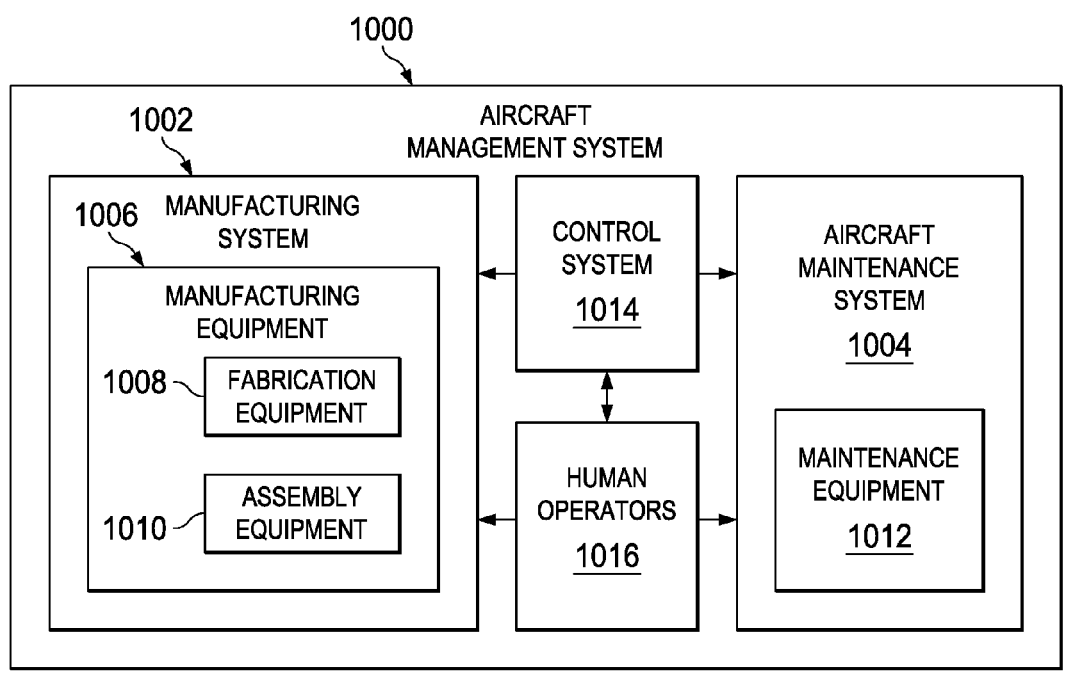
FIG. 10 is an illustration of a block diagram of an aircraft management system in accordance with an illustrative embodiment.

Turning now to FIG. 10, an illustration of a block diagram of an aircraft management system is depicted in accordance with an illustrative embodiment. Aircraft management system 1000 is a physical hardware system. In this illustrative example, aircraft management system 1000 may include at least one of manufacturing system 1002 or aircraft maintenance system 1004.

Manufacturing system 1002 is configured to manufacture products, such as an aircraft. As depicted, manufacturing system 1002 includes manufacturing equipment 1006. Manufacturing equipment 1006 includes at least one of fabrication equipment 1008 or assembly equipment 1010.

Fabrication equipment 1008 is equipment that may be used to fabricate components for parts used to form an aircraft. For example, fabrication equipment 1008 may include machines and tools. These machines and tools may be at least one of a drill, a hydraulic press, a furnace, a mold, a composite tape laying machine, a vacuum system, a lathe, or other suitable types of equipment. Fabrication equipment 1008 may be used to fabricate at least one of metal parts, composite parts, semiconductors, circuits, fasteners, ribs, skin panels, spars, antennas, or other suitable types of parts.

Assembly equipment 1010 is equipment used to assemble parts to form an aircraft. In particular, assembly equipment 1010 may be used to assemble components and parts to form an aircraft. Assembly equipment 1010 also may include machines and tools. These machines and tools may be at least one of a robotic arm, a crawler, a faster installation system, a rail-based drilling system, or a robot. Assembly equipment 1010 may be used to assemble parts such as seats, horizontal stabilizers, wings, engines, engine housings, landing gear systems, and other parts for an aircraft.

In this illustrative example, aircraft maintenance system 1004 includes maintenance equipment 1012. Maintenance equipment 1012 may include any equipment needed to perform maintenance on an aircraft. This maintenance may include tools for performing different operations on parts on the aircraft. These operations may include at least one of disassembling parts, refurbishing parts, inspecting parts, reworking parts, manufacturing placement parts, or other operations for performing maintenance on the aircraft. These operations may be for routine maintenance, inspections, upgrades, refurbishment, or other types of maintenance operations.

In the illustrative example, maintenance equipment 1012 may include ultrasonic inspection devices, x-ray imaging systems, vision systems, drills, crawlers, and other suitable device. In some cases, maintenance equipment 1012 may include fabrication equipment 1008, assembly equipment 1010, or both to produce and assemble parts that may be needed for maintenance.

Aircraft management system 1000 also includes control system 1014. Control system 1014 is a hardware system and may also include software or other types of components. Control system 1014 is configured to control the operation of at least one of manufacturing system 1002 or aircraft maintenance system 1004. In particular, control system 1014 may control the operation of at least one of fabrication equipment 1008, assembly equipment 1010, or maintenance equipment 1012.

The hardware in control system 1014 may be using hardware that may include computers, circuits, networks, and other types of equipment. The control may take the form of direct control of manufacturing equipment 1006. For example, robots, computer-controlled machines, and other equipment may be controlled by control system 1014. In other illustrative examples, control system 1014 may manage operations performed by human operators 1016 in manufacturing or performing maintenance on an aircraft. In these illustrative examples, robotic platform evaluation system 108, and in particular evaluator 110, may be implemented in control system 1014 to manage at least one of the manufacturing or maintenance of an aircraft. Evaluator 110 may be used to evaluate the configuration in operating area 106 in at least one of manufacturing system 1002 or aircraft maintenance system 1004 with respect to effect of environmental signals for robotic platforms that may be used those types of areas In the different illustrative examples, human operators 1016 may operate or interact with at least one of manufacturing equipment 1006, maintenance equipment 1012, or control system 1014. This interaction may be performed to manufacture an aircraft.

Of course, aircraft management system 1000 may be configured to manage other products other than an aircraft. Although aircraft management system 1000 has been described with respect to manufacturing in the aerospace industry, aircraft management system 1000 may be configured to manage products for other industries. For example, aircraft management system 1000 may be configured to manufacture products for the automotive industry as well as any other suitable industries.

Thus, the illustrative embodiments may be used to provide an evaluation of the operation of a robotic platform operating area. An evaluator may be used to determine whether environmental signals in the operating area are results in an undesired response in the operation of the robotic platforms in the operating area. In particular, the response may be identified for input to the robotic platforms.

In this manner, the evaluation may allow for one or more actions to be taken. The actions may include, for example, making changes to the robotic platforms, other objects in the operating area, locations of objects, and other suitable types of actions.

With the use of the evaluator, configuring operating areas may be formed with less time and effort. The illustrative examples allow for simulation of environmental signals within the operating area without requiring the actual sources of environmental signals.

For example, environmental signals in the form of sounds may result in an absence of undesired responses of robotic machines to input, such as those in the form of verbal commands from a human operator. Sound signals in the operating area may reduce the accuracy in understanding commands.

Further, in some cases, verbal commands may include directionality with respect to a human operator. For example, a verbal command may be "bring three panels to me."

With this example, sound signals from a drill in the operating area may reduce the ability of the robotic platform to identify the direction where the human operator is located to perform the command. As a result, the robotic platform may be able to understand the command but may not be able to complete performance of the command, resulting in an undesired response.

An identification of sound signals that result in undesired responses may allow for identification of actions to reduce the undesired response. For example, the drill may be moved to another location, a different type of drill may be used, a sound barrier may be placed between the drill and the robotic platform, or some other suitable action may be taken.

These and other types of evaluations with respect to the performance of operations by robotic platforms may be made with less time and effort in aircraft management system 1000. For example, planned configurations for aircraft management system 1000 may be evaluated without setting up an entire operating area with actual sources for environmental signals. Instead, the generation of the sound signals may be performed without the actual sound sources in a virtual manner, reducing the time and effort needed to evaluate a particular configuration of the operating area.

Though the illustrative examples are described with respect to aircraft management system 1000, other illustrative examples may be applied to other environments in which robotic platforms are present. For example, an illustrative embodiment may be applied to the system such as an automobile manufacturing environment, a maintenance environment, an oil exploration or drilling environment, a shipbuilding environment, and other suitable environments.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for determining a response of a group of robotic platforms in an operating area, the method comprising:
controlling the group of robotic platforms to perform operations in the operating area;
identifying a group of environmental signal models;
controlling a signal generator remote from the robotic platforms to generate environmental signals in the operating area using the group of environmental signal models, wherein the signal models comprise one or more of a light model or a sound model, wherein the signal models simulate a source of environmental signals not present in the operating area;
identifying the response of the group of robotic platforms to an input while the environmental signals are generated; and
determining whether the response is a desired response based on the input and the environmental signals by comparing the response to a group of rules applied to the response, wherein the response is identified by at least one sensor located in the group of robotic platforms or other location in the operating area.

2. The method of claim 1 further comprising:
displaying the operations of the group of robotic platforms in the operating area on a display system; and
displaying a graphical representation of a visualization of the environmental signals with respect to the operating area on the display system.

3. The method of claim 1 further comprising:
performing an action to reduce an undesired response from the group of robotic platforms.

4. The method of claim 3, wherein the action is selected from at least one of changing a configuration of the operating area, selecting a different group of robotic platforms, or adding objects in the operating area to reduce the undesired response.

5. The method of claim 1 further comprising:
generating the input in the operating area during operation of the group of robotic platforms in the operating area.

6. The method of claim 5, wherein the input is selected from at least one of audible instructions and sensor input.

7. The method of claim 1, wherein the environmental signals are selected for at least one of sound, light, or vibrations.

8. The method of claim 1, wherein the input is selected from at least one of sensor input or communications input.

9. The method of claim 1, wherein the group of robotic platforms is selected from at least one of an inspection robot, a sensing robot, a communications robot, a robotic arm with an end effector, a transport robot, or a fastener installation robot.

10. The method of claim 1, wherein the group of robotic platforms perform the operations for at least one of manufacturing, maintenance, or inspection.

11. The method of claim 1, wherein the operating area is selected from at least one of a test area, a manufacturing area, an inspection area, a maintenance area, a hanger, or a tarmac.

12. The method of claim 1, wherein:
the input comprises audible instructions,
the environmental signal models comprise sounds models,
the environmental signals comprise sounds that are generated based on the sounds models, and
the sounds interfere with the audible instructions.

13. The method of claim 1, wherein:
the input comprises sensor input,
the environmental signal models comprise light models,
the environmental signals comprise lights that are generated based on the light models,
the lights interfere with the sensor input.

14. A robotic platform system comprising:
an evaluator configured to:
control a group of robotic platforms to perform an operation in the operating area:
identify a group of environmental signal models;
control a signal generator remote from the group of robotic platforms in an operating area using the group of environmental signal models comprising one or more of a light model or a sound model while the group of robotic platforms perform operations in the operating area, wherein the signal models simulate a source of environmental signals not present in the operating area;
identify a response of the group of robotic platforms to an input while the environmental signals are generated; and
determine whether the response is a desired response based on the input and the environmental signals by comparing the response to a group of rules applied to the response, wherein the response is identified by at least one sensor located in the group of robotic platforms or other location in the operating area.

15. The robotic platform evaluation system of claim 14, wherein the evaluator is further configured to display the operations of the group of robotic platforms in the operating area on a display system; and display a graphical representation of a visualization of the environmental signals with respect to the operating area on the display system.

16. The robotic platform evaluation system of claim 14, wherein an action is performed to reduce an undesired response from the group of robotic platforms and the action is selected from at least one of changing a configuration of the operating area, selecting a different group of robotic platforms, or adding objects in the operating area to reduce the undesired response.

17. The robotic platform evaluation system of claim 14, wherein the evaluator is further configured to generate the input in the operating area during an operation of the group of robotic platforms in the operating area.

18. The robotic platform evaluation system of claim 17, wherein the input is selected from at least one of audible instructions and sensor input.

19. The robotic platform evaluation system of claim 14, wherein the environmental signals are selected for at least one of sound, light, or vibrations.

20. The robotic platform evaluation system of claim 14, wherein the group of robotic platforms is selected from at least one of an inspection robot, a sensing robot, a communications robot, a robotic arm with an end effector, a transport robot, or a fastener installation robot.

21. The robotic platform evaluation system of claim 14, wherein the group of robotic platforms perform the operations for at least one of manufacturing, maintenance, or inspection.

22. The robotic platform evaluation system of claim 14, wherein the operating area is selected from at least one of a test area, a manufacturing area, an inspection area, a maintenance area, a hanger, or a tarmac.

23. An aircraft management system comprising:
   a control system configured to control equipment in the aircraft management system; and
   an evaluator in the control system, wherein the evaluator is configured to:
   control a group of robotic platforms in the equipment to perform operations in an operating area in the aircraft management system;
   identify a group of environmental signal models;
   control a signal generator remote from the robotic platforms in the operating area using the group of environmental signal models comprising one or more of a light model or a sound model, wherein the signal models simulate a source of environmental signals not present in the operating environment;
   identify a response of the group of robotic platforms to an input while the environmental signals are generated; and
   determine whether the response is a desired response based on the input and the environmental signals by comparing the response to a group of rules applied to the response, wherein the response is identified by at least one sensor located in the group of robotic platforms or other location in the operating area.

24. The aircraft management system of claim 23, wherein an action is identified when an undesired response is present in which the action is selected from at least one of changing a configuration of the operating area, selecting a different group of robotic platforms, or adding objects in the operating area to reduce the undesired response.

25. The aircraft management system of claim 23, wherein the equipment comprises at least one of manufacturing equipment and maintenance equipment.

* * * * *